US005441081A

United States Patent [19]

Maury

[11] Patent Number: 5,441,081

[45] Date of Patent: Aug. 15, 1995

[54] IMMERSION TUBE FOR A CYCLONE

[76] Inventor: Hans-Dietmar Maury, Hindemithstrasse 5, 59227 Ahlen, Germany

[21] Appl. No.: 144,772

[22] Filed: Oct. 29, 1993

[30] Foreign Application Priority Data

Oct. 31, 1992 [DE] Germany ........................ 42 36 895.2

[51] Int. Cl.[6] ............................................ F16L 11/16

[52] U.S. Cl. ...................................... 138/44; 138/107; 138/155; 55/267

[58] Field of Search ................. 138/107, 44, 155, 149, 138/143, 176, 142, 178, 177; 55/267, 411, 459.4

[56] References Cited

U.S. PATENT DOCUMENTS

| | | | |
|---|---|---|---|
| 4,259,993 | 4/1981 | Scholz | 138/155 |
| 4,328,839 | 5/1982 | Lyons et al. | 138/155 |
| 4,475,749 | 10/1984 | Pforr et al. | 138/149 |
| 4,505,051 | 3/1985 | Herchenbach | 55/267 X |
| 4,651,783 | 3/1987 | Christiansen | 138/107 |

FOREIGN PATENT DOCUMENTS

| | | |
|---|---|---|
| 2124932 | 2/1984 | United Kingdom . |
| 8404471 | 11/1984 | WIPO . |
| 8800310 | 1/1988 | WIPO . |

*Primary Examiner*—David A. Scherbel
*Assistant Examiner*—Patrick F. Brinson
*Attorney, Agent, or Firm*—Robert W. Becker & Associates

[57] ABSTRACT

An immersion tube for a cyclone has a plurality of rings stacked atop one another and connected to one another. Each ring is comprised of a plurality of plate-shaped segments. The plate-shaped segments of one ring are suspended under the force of gravity from the plate-shaped segments of another ring positioned above said one ring for connecting the segments of each ring to one another. Each segment has contact surfaces for connecting each segment of the one ring to the segments of the other ring positioned above said one ring, wherein the contact surfaces comprise first inclined planes facing outwardly with respect to the immersion tube. Preferably, the contact surfaces comprise also second inclined planes facing inwardly with respect to the immersion tube.

14 Claims, 3 Drawing Sheets

IMMERSION TUBE FOR A CYCLONE

BACKGROUND OF THE INVENTION

The present invention relates to an immersion tube for a cyclone, comprised of a plurality of rings arranged atop one another, wherein each of the rings is comprised of a plurality of plate-shaped segments.

Immersion tubes in cyclones serve to remove the lighter volatile components along the axis of the cyclone in an upward direction without impeding the upward flow by the tangentially incoming medium. In order to provide optimal flow conditions within the cyclones, the size of the immersion tube must be adapted to the dimensions of the cyclone. Such adaptations cannot be performed with known immersion tubes because they are with respect to their construction and shape especially designed for a certain cyclone type.

It is therefore an object of the present invention to provide an immersion tube for a cyclone which is suitable for adaptation to differently sized cyclones designs and in which individual components can be easily replaced.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
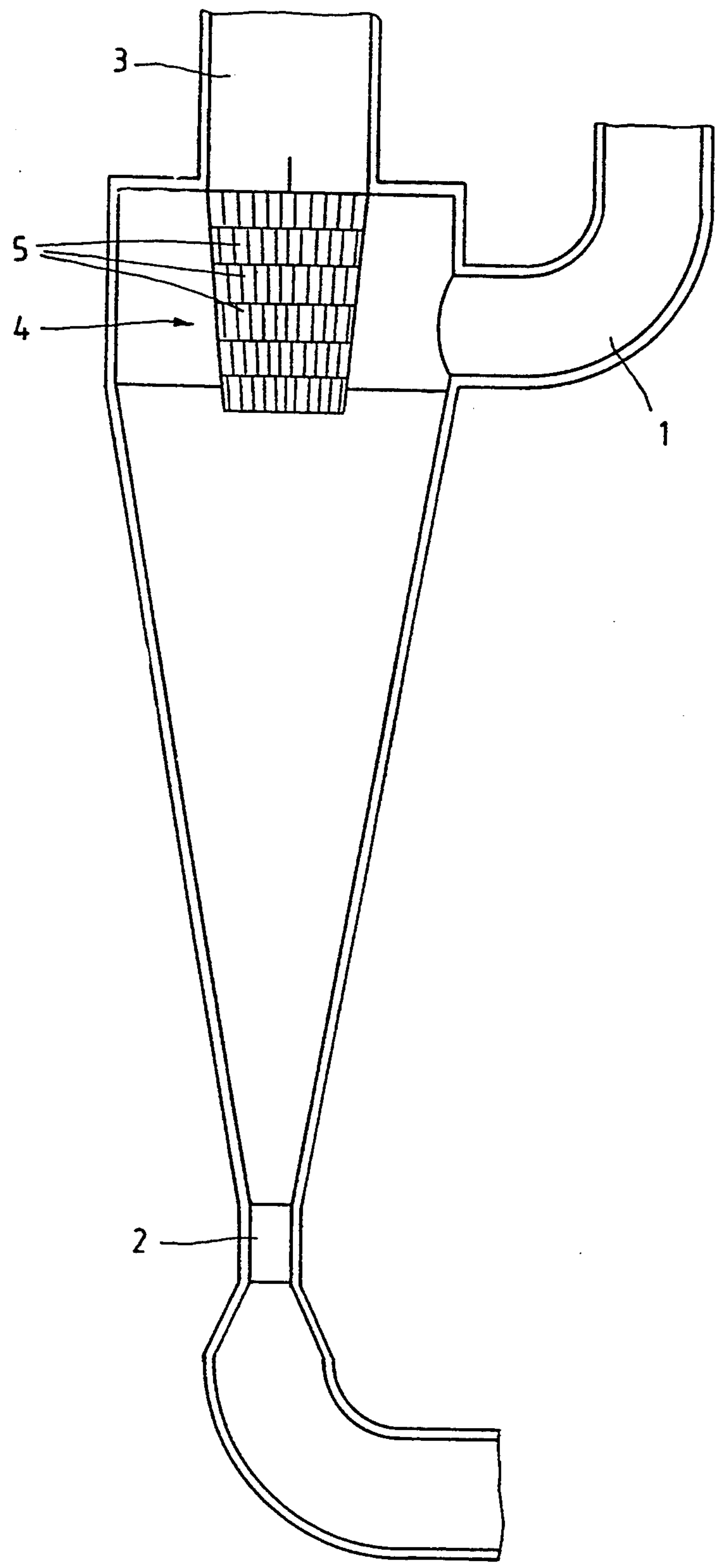
FIG. 1 shows in longitudinal section a simplified representation of a cyclone with a suspended immersion tube comprised of a plurality of individual segments.

The immersion tube for a cyclone according to the present invention is primarily characterized by:

A plurality of rings stacked atop one another and connected to one another;

Each ring comprised of a plurality of plate-shaped segments;

The plate-shaped segments of one ring being suspended under the force of gravity from the plate-shaped segments of another ring positioned above said one ring for connecting the segments of each ring to one another;

Each segment having contact surfaces for connecting each segment of the one ring to the segments of the other ring positioned above said one ring, wherein the contact surfaces comprise first inclined planes facing outwardly with respect to the immersion tube.

Expediently, the contact surfaces comprise second inclined planes facing inwardly with respect to the immersion tube. Some of the second inclined planes extend vertically.

Preferably, an angle of inclination of the first and the second inclined planes to a plane defined by a flat surface of the segments is substantially 45°.

In a preferred embodiment of the present invention, the angle between the first and the second inclined planes in a plane defined by a flat surface of the segments is 60° to 80°.

Each segment has a T-shaped projection and the first and the second inclined planes are located at the T-shaped projection. Expediently, each segment has cutouts and the first and the second inclined planes are furthermore located at the cutouts. The T-shaped projection is preferably positioned at an upper end of each segment and the T-shaped projection of a segment of one ring is inserted flush into the cutouts of the segments of the other ring.

Preferably, the T-shaped projection is inserted into the cutouts of adjacent ones of the segments of the other ring to clamp adjacent ones of the segments of the other ring in a circumferential direction of the immersion tube.

In a preferred embodiment of the present invention, each segment further comprises an I-shaped connector and the T-shaped projection is an upper half of the I-shaped connector. Each segment has a further T-shaped cutout located at an upper end of the segment, the "T" of the T-shaped cutout positioned upside down. The I-shaped connector is inserted in a form-locking manner with a lower half into the T-shaped cutout.

Expediently, the T-shaped projection has a flat element connected thereto and the flat element rests at an outwardly facing surface of the segments of the other ring. Each segment is cast and the T-shaped projection, and optionally the flat element, is a unitary part of the cast segment.

Each segment has cutouts and the first and the second inclined planes are located at the cutouts.

Preferably, the immersion tube has a downwardly tapering conical frustum shape.

According to the present invention it is suggested for connecting the segments of one ring to the segments of another ring to suspend the segments of the lower ring under the force of gravity from the upper ring. The contact surfaces of each segment for connection to a segment arranged above is at least partially in form of inclined planes which are facing outwardly with respect to the outside of the immersion tube. With the present invention a self-stabilizing immersion tube is provided which is stabilized exclusively by the effect of the force of gravity and which is comprised of individual segments that in the form of building blocks can be attached to one another to form individual rings. The immersion tube is thus extended in the vertical direction. In the inventive manner, the immersion tube can be adapted as desired to the corresponding flow conditions within a respective cyclone. Since the contact surfaces for connecting a segment to a segment positioned above are at least partially in the form of inclined planes inclined outwardly with respect to the immersion tube, new segments can be securely fastened to already present segments. Due to the orientation of the inclined planes of the contact surfaces, the suspended segment is subjected to a radially inwardly acting force until it abuts at a neighboring segment. With this measure of self-adjusting the individual segments within the formed assembly, a high stability of the immersion tube, even in the presence of high flow velocities within the cyclone, is ensured.

Furthermore, it is possible, when repairs are required, to replace individual segments of the assembly with a new flawless segment. The inventive immersion tube therefore also allows for an especially simple exchange or replacement of individual components.

In a further embodiment of the present invention, the contact surfaces for connecting a respective segment to a segment arranged above may also be provided in the form of inclined planes which are inwardly oriented with respect to the immersion tube. Due to the cooperation of inclined planes facing outwardly and inwardly a secure self-adjustment of the individual segments within the assembly is achieved so that the immersion tube is stable even at high flow velocities within the cyclone.

Advantageously, at least a portion of the inwardly inclined planes of the immersion tube extend in the vertical direction. This results in a great positional stability of the individual segments within the assembly with the advantage of a simple exchangability of the individual segments.

The angle of the inclined planes within a plane defined by the flat (main) surface of the segment is 30° to 60°. Preferably, the angle is approximately 45°. In the plane defined by the flat (main) surfaces of the segments the angle between the inclined planes facing inwardly and outwardly is preferably 60° to 80°. This ensures that the segment during insertion can be easily laterally aligned (in the circumferential direction of the immersion tube).

In a preferred embodiment of the present invention it is suggested that the contact surfaces in the form of inclined planes are provided at projections and/or cutouts of the segments which are in the shape of the end of bones, i.e., are T-shaped. The individual segments thus can be assembled in the manner of a puzzle so that, with respect to radial forces as well as with respect to tangentially acting forces, a great stability of the assembly is achieved.

The T-shaped projections are preferably arranged at the upper end of the segments and are inserted flush into the corresponding cutouts of the segments arranged above. With respect to a greatest possible locking between the individual segments it is also advantageous, when the projection of one segment is inserted into the cutouts of two adjacent segments arranged above so that these segments are clamped relative to one another in the circumferential direction of the immersion tube.

A further embodiment of the immersion tube is characterized by flat elements connected to the T-shaped projections at their outwardly facing surfaces which flat elements come to rest areally at the outside of the segments arranged above. Preferably, the T-shaped projections, and optionally also the flat elements, are a unitary part of the segment which is preferably manufactured by casting.

An additional increase of the stability of the immersion tube is achieved by providing the immersion tube with a downwardly tapering conical frustum shape. This also results in an improvement of the flow conditions within and around the immersion tube.

DESCRIPTION OF PREFERRED EMBODIMENTS

The present invention will now be described in detail with the aid of several specific embodiments utilizing FIGS. 1 through 6.

The cyclone represented in FIG. 1 is provided with an inlet 1 opening into the upper cylindrical portion, a first outlet 2 for the heavier components that have been separated within the centrifugal field, as well as a second outlet 3 for the lighter components that flow upwardly. The second outlet 3 extends in the downward direction forms the conically tapering immersion tube 4. Construction and operation of a cyclone are well known in the art so that no further explanation as to the operation of a cyclone will be provided.

The immersion tube 4 is comprised of a plurality of individual segments 5, as shown in FIG. 1. The segments 5 are combined to form rings which are suspended within the cyclonee. In the embodiment shown, a total of six rings is provided whereby each individual ring is comprised of a plurality of individual segments 5. The individual segments 5 are plate-shaped and are curved to correspond to the curvature of the conically shaped immersion tube 4. Due to the conical design of the immersion tube 4, all segments 5 of one ring are therefore identical; however, the segments of the different rings have different widths whereby the width decreases from the top to the bottom. Each of the elements 5 is a unitary cast steel part and exhibits therefore a relatively high temperature resistance.

Figure 2:
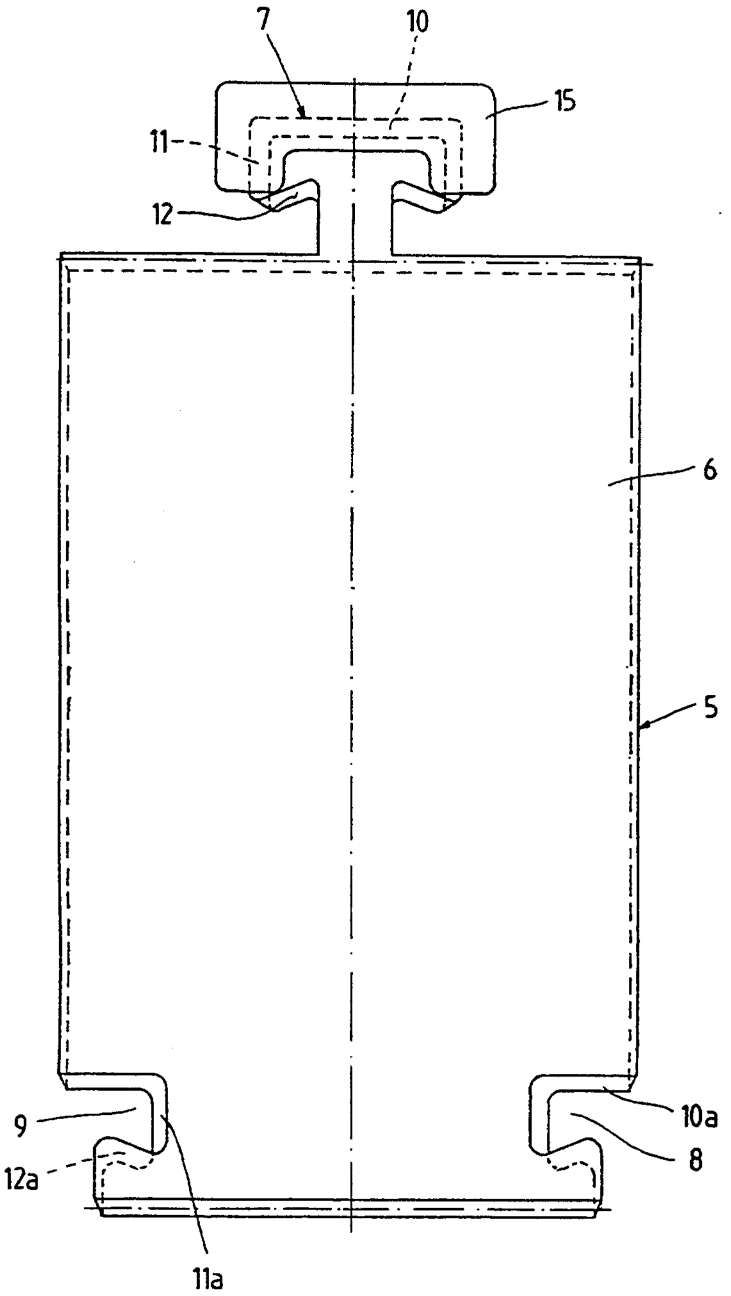
FIG. 2 shows a front view of a first embodiment of an individual segment of the immersion tube.
Figure 3:
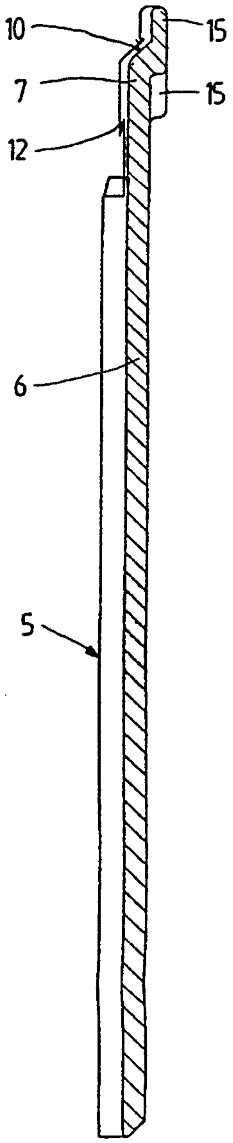
FIG. 3 shows a section along the axis of symmetry of the segment of FIG. 2.

The design of an individual segment 5 will be explained in the following with the aid of FIGS. 2 and 3. The segment 5 is primarily comprised of a plate 6 which is basically square or rectangular and, due to the conical shape of the immersion tube, has a slight trapezoidal shape. The plate 6 is curved according to the curvature of the immersion tube as can be seen especially in the sectional view of FIG. 3. At the upper end of the plate 6 a projection 7 is provided which is essentially T-shaped, respectively, has the shape of the end of a bone. Furthermore, the two lower ends of the plates 6 are provided with cutouts 8, 9 whereby the geometry of the cutout 8 at the right hand corner corresponds to the left half of the projection 7 and the geometry of the cutout 9 at the left hand corner corresponds to the right half of the projection 7 in an almost identical manner. Accordingly, when two of the segments 5 represented in FIG. 2 are positioned directly adjacent to one another, the two cutouts 8, 9 abutting one another form a recess or cutout into which a projection 7 of the further segment 5 would fit exactly. The assembly of individual segments 5 can thus be compared to assembling a puzzle.

Of special importance is the geometry of the projection 7 as well as of the cutouts 8, 9 and especially the design of the contact surfaces provided at the T-shaped projections, respectively, cutouts. These contact surfaces provide the connection between the individual segments 5 and interlock them. Details of the inventive principle will now be explained with the aid of FIG. 6.

Figure 6:
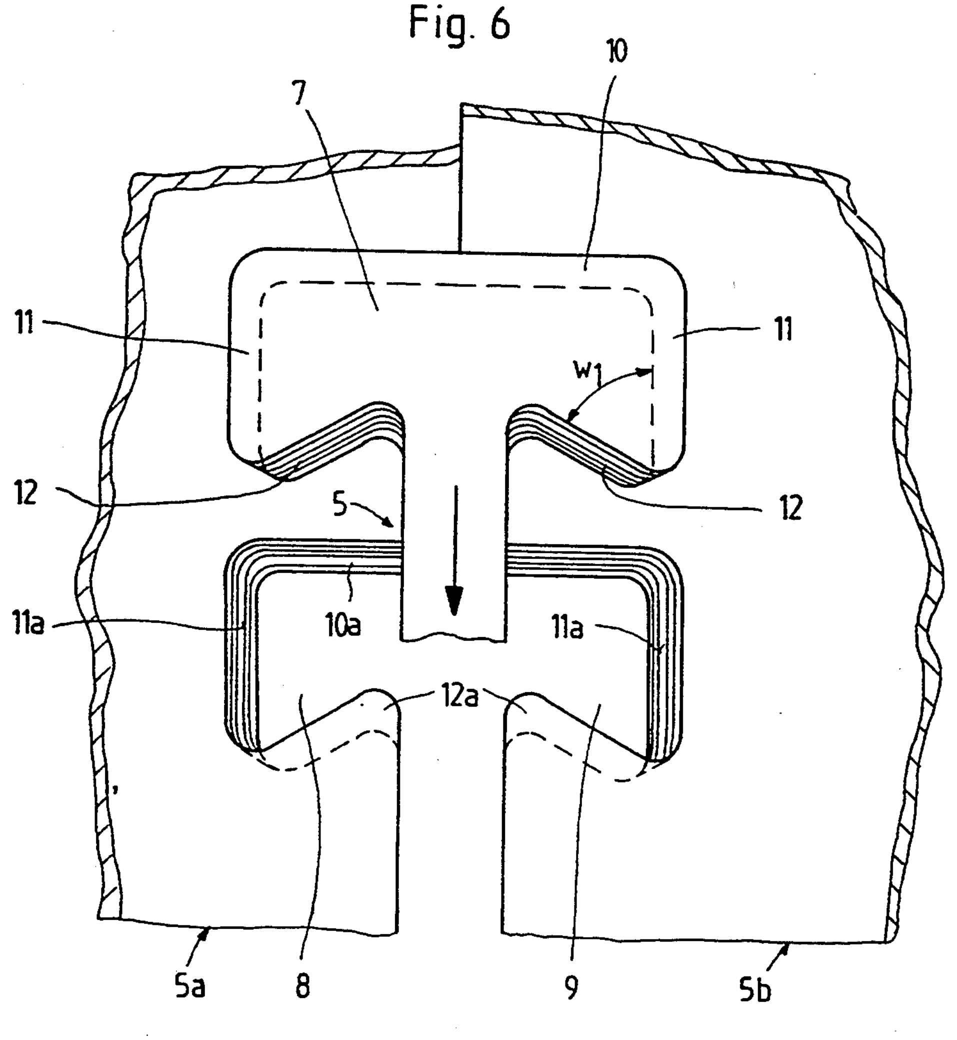
FIG. 6 shows a detail of the connection of three segments.

The T-shaped projection 7 has an upper, substantially horizontally extending contact surface 10, two laterally positioned, substantially vertically extending contact surfaces 11 as well as two contact surfaces 12 in the undercut portion. The contact surfaces 12 do not extend horizontally, but are slightly slanted forming an angle $w_1$ to the vertical in the plane corresponding to the flat (main) surface of the segments 5. The dashed lines in the drawing as well as the additional hatching in FIG. 6 illustrate that all of the contact surfaces 10, 11, 12 of the projection 7 are in the form of slanted planes, whereby the contact surfaces, i.e., the slanted planes 10 and 11 are oriented differently than the contact surfaces in the form of the inclined planes 12. The inclination of the inclined planes 10 and 11 is such that they are oriented toward the interior of the immersion tube, while the inclined plane 12 is outwardly oriented. All of the inclined planes 10, 11, 12 are slanted at an angle of approximately 45° relative to the flat surface of the segments 5.

At the lower portion of FIG. 6 it is shown that the two cutouts 8, 9 of adjacently arranged segments 5*a*, 5*b* are substantially symmetric to one another and with their geometry almost exactly correspond to the design of the T-shaped projection 7. The inclined planes 10 and 11 of the T-shaped projection 7 correspond to the outwardly oriented counter planes 10*a*, 11*a* at the cutouts 8, 9, while the inclined planes 12 of the T-shaped projection 7 correspond to the inwardly oriented counter planes 12*a* of the cutouts 8, 9.

When the segment 5 provided with the T-shaped projection 7 is inserted, in the manner represented in FIG. 6, at an angle from the top into the segments 5*a*, 5*b*, the slanted surfaces 12 first glide along the counter surface 12*a* until the inwardly oriented inclined planes 10, 11 are flush with the outwardly oriented counter planes 10*a*, 11*a*. In this manner a suspension of the segment 5 from the segments 5*a*, 5*b* arranged above is achieved as well as, additionally, a clamping of the two segments 5*a*, 5*b* because, due to the angle $w_1$ between the inclined planes 12, respectively, counter plane 12*a* and the vertical, a force is generated which pulls the segments 5*a*, 5*b* toward one another.

In the aforedescribed manner it is not only possible to insert new segments 5 into an already present immersion tube 4, but it is also possible to remove and replace individual segments 5 from the otherwise unchanged assembly.

Figure 4:
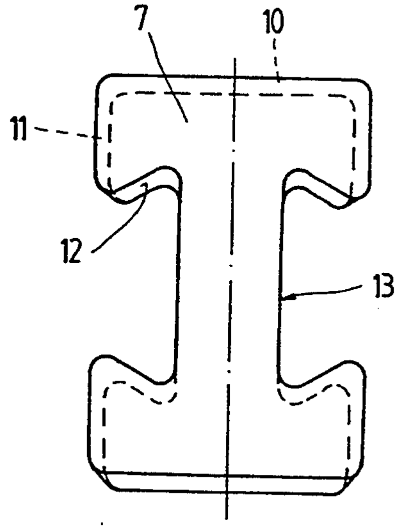
FIG. 4 shows a front view of a connector for a second embodiment of the segment.
Figure 5:
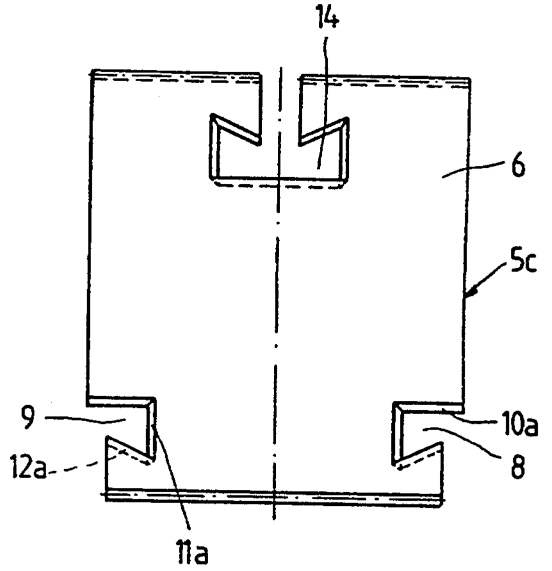
FIG. 5 shows a front view of the second embodiment of the segment.

In the variation represented in FIGS. 4 and 5, each segment 5*c* is provided with a connector 13. The connector 13 represented in FIG. 4 is essentially bone-shaped or I-shaped, and its upper half corresponds to the T-shaped projection 7 of the embodiment of FIGS. 2 and 3. The lower half can be inserted into a corresponding T-shaped recess or cutout 14 of the segment 5*c*. Segment 5*c* and connector 13 can then be inserted in the same manner as described for segment 5 into the assembly of further segments forming an immersion tube corresponding to the embodiment of FIGS. 2 and 3. The segment 5 according to FIGS. 2 and 3 is additionally provided with a flat element 15 connected to the outside of the T-shaped projection 7. The flat element 15, which is formed during casting of the segment 5, is resting flat at the outside of the above segment in the mounted state and has the effect that the segment 5 during insertion or removal from the assembly cannot be pivoted, but must always be guided inclined, but in a vertical orientation for assembly and disassembly. Furthermore, the flat element 15 facilitates handling of the segment 5.

The present invention is, of course, in no way restricted to the specific disclosure of the specification and drawings, but also encompasses any modifications within the scope of the appended claims.

What I claim is:

1. An immersion tube for a cyclone, said immersion tube comprised of:

- a plurality of rings stacked atop one another and connected to one another;
- each said ring comprised of a plurality of plate-shaped segments positioned at a same level;
- said plate-shaped segments of one said ring being suspended under the force of gravity from said plate-shaped segments of an other said ring positioned above said one ring for connecting said segments of each said ring to one another;
- each said segment having contact surfaces for connecting each said segment of said one ring to said segments of said other ring positioned above said one ring, wherein said contact surfaces comprise first inclined planes facing outwardly with respect to said immersion tube;
- said plate-shaped segments of each one of said rings abutting one another so as to form a closed annular structure; and
- wherein any two abutting ones of said plate-shaped segments of said other ring positioned above said one ring are clamped together by one of said plate-shaped segments of said one ring in a circumferential direction of said immersion tube.

2. An immersion tube according to claim 1, wherein said contact surfaces comprise second inclined planes facing inwardly with respect to said immersion tube.

3. An immersion tube according to claim 2, wherein some of said second inclined planes extend vertically.

4. An immersion tube according to claim 2, wherein an angle of inclination of said first and said second inclined planes to a plane defined by a flat surface of said segments is substantially 45°.

5. An immersion tube according to claim 2, wherein an angle between said first and said second inclined planes in a plane defined by a flat surface of said segments is 60° to 80°.

6. An immersion tube according to claim 2, wherein each said segment has a T-shaped projection and wherein said first and said second inclined planes are located at said T-shaped projection.

7. An immersion tube according to claim 6, wherein each said segment has cutouts and wherein said first and said second inclined planes are furthermore located at said cutouts.

8. An immersion tube according to claim 7, wherein said T-shaped projection is positioned at an upper end of each said segment and wherein said T-shaped projection of said segments of one said ring is inserted flush into said cutouts of said segments of said other ring.

9. An immersion tube according to claim 8, wherein said T-shaped projection is inserted into said cutouts of adjacent ones of said segments of said other ring to clamp said adjacent ones of said segments of said other ring in a circumferential direction of said immersion tube.

10. An immersion tube according to claim 8, wherein:

- each said segment further comprises an I-shaped connector and said T-shaped projection is an upper half of said I-shaped connector;
- each said segment has a further T-shaped cutout located at an upper end of said segment, with the T of said T-shaped cutout positioned upside down; and
- said I-shaped connector is inserted in a form-locking manner with a lower half into said T-shaped cutout.

11. An immersion tube according to claim 7, wherein said T-shaped projection has a flat element connected thereto and wherein said flat element rests at an outwardly facing surface of said segments of said other ring.

12. An immersion tube according to claim 11, wherein each said segment is cast and wherein said T-shaped projection, and optionally said flat element, is a unitary part of said cast segment.

13. An immersion tube according to claim 2, wherein each said segment has cutouts and wherein said first and said second inclined planes are located at said cutouts.

14. An immersion tube according to claim 1, having a downwardly tapering conical frustum shape.

* * * * *